United States Patent [19]

Berkovich

[11] Patent Number: 5,103,770
[45] Date of Patent: Apr. 14, 1992

[54] PET EXERCISING DEVICE

[76] Inventor: Weslie D. Berkovich, 2060 Avenida De Los Arboles, #266, Thousand Oaks, Calif. 91362

[21] Appl. No.: 726,741

[22] Filed: Jul. 8, 1991

[51] Int. Cl.⁵ .................. A01K 15/00; A63G 1/34
[52] U.S. Cl. ............................. 119/29; 446/236; 472/7; 472/34
[58] Field of Search ........... 119/116, 117, 120, 121, 119/29; 272/31 R, 44, 31 A; 446/236, 247

[56] References Cited

U.S. PATENT DOCUMENTS

| | | | |
|---|---|---|---|
| 3,356,365 | 12/1967 | De Shano | 272/44 |
| 3,665,892 | 5/1972 | Kusisto | 119/29 |
| 3,716,029 | 2/1973 | Pillsburt, Jr. | 119/29 |
| 4,422,257 | 12/1983 | McCrory | 272/31 R X |

Primary Examiner—Gene Mancene
Assistant Examiner—Thomas Price
Attorney, Agent, or Firm—Robert M. Sperry

[57] ABSTRACT

An improved pet exercising device comprising a toy suspended from a motorized arm having an electronic control capable of actuating the device at predetermined or random intervals and for varying the speed and direction of movement of the toy to provide movements which are more attractive to pets and which are not apparently repetitive and, hence, are more challenging and interesting to the pet, especially to cats.

16 Claims, 1 Drawing Sheet

PET EXERCISING DEVICE

BACKGROUND

1. Field of Invention

This invention relates to pet exercising devices and is particularly directed to apparatus for exercising cats and the like.

2. Prior Art

Domestic animals, especially pets, are provided, by their owners, with food, water, shelter and virtually all of the necessities of life with little or no effort on the part of the animals. In consequence, tend to become lazy and fail to get adequate exercise to keep themselves in good physical condition. This is particularly true of cats who, by nature, tend to sleep much of the time. In the wild, this trait allows the cats to store their energy for the sudden, quick burst of speed and force necessary to make a kill. However, for domestic cats, who have no need to hunt for food, this trait results in obesity and coronary problems, which make the cat sluggish and further aggravate the problem. Dogs are more tractable than cats and can be trained to chase and fetch, to follow a jogging person or slow moving car or to take some other form of exercise. On the contrary, cats are more independent and will only participate in exercise activities if it happens to suit their mood. Thus, a cat may chase a ball rolled across a floor—or it may not. It may, or may not, play with a catnip toy, etc. Consequently, it is particularly difficult to assure that cats get the exercise needed for good health.

Various types of pet exercising devices have been proposed to overcome this problem. Some prior art exercising devices provide rotating arms, mounted on a pylon or the like, and having a collar or harness secured to the arm by a leash, so that an animal wearing the collar or harness will be urged to walk or trot in a circle about the pylon. Horses are regularly exercised in this manner and some dogs are also amenable to this type of exercising device. However, most cats will strongly resist such devices and will dig their claws into the ground or carpet and fight being dragged about by the device with all their strength. This may provide some degree of exercise, but is not conducive to improving the disposition of the cat or enhancing the relationship between the cat and its owner. Other prior art exercising devices suspend a toy, such as a ball or a toy mouse, from a resilient arm member so that, when struck, the toy will bounce about to provide some degree of movement and liveliness which may awake the cat's hunting instincts and may cause it to chase or bat the toy. On the other hand, the toy will normally hang motionless and uninteresting, unless initially struck either by the cat or its owner, and, unless such striking is repeated, the toy will shortly return to its motionless and uninteresting condition. Most cats rapidly lose interest in such devices and, even when the toy is struck, will pay only brief attention to the device. A search in the United States Patent Office has revealed the following references:

| U.S. Pat. No. | INVENTOR | ISSUED |
| --- | --- | --- |
| 3,716,029 | C. H. Pillsbury, Jr. | Feb. 13, 1973 |
| 3,665,892 | I. W. Kusisto | May 30, 1972 |
| 4,517,922 | J. K. Lind | May 21, 1985 |
| 4,803,953 | M. S. Graves | Feb. 14, 1989 |

Each of these patents is subject to the limitations discussed above. Thus, none of the prior art pet exercising devices have been entirely satisfactory.

BRIEF SUMMARY AND OBJECTS OF INVENTION

These disadvantages of prior art pet exercising devices are overcome with the present invention. An improved pet exercising device is proposed which can provide unexpected burst of activity from the toy and which can vary the speed and direction of movement of the toy to provide movements which are more attractive to pets and which are not apparently repetitive and, hence, are more challenging and interesting to the pet, especially to cats.

The advantages of the present invention are preferably attained by providing an improved pet exercising device comprising a toy suspended from a motorized arm having an electronic control means capable of actuating the device at predetermined or random intervals and for varying the speed and direction of movement of the toy to provide movements which are more attractive to pets and which are not apparently repetitive and, hence, are more challenging and interesting to the pet, especially to cats.

Accordingly, it is an object of the present invention to provide an improved pet exercising device.

Another object of the present invention is to provide an improved pet exercising device which will be especially interesting to cats.

An additional object of the present invention is to provide an improved pet exercising device which can provide unexpected burst of activity from a toy.

A further object of the present invention is to provide an improved pet exercising device which can vary the speed and direction of movement of a toy.

A specific object of the present invention is to provide an improved pet exercising device comprising a toy suspended from a motorized arm having an electronic control means capable of actuating the device at predetermined or random intervals and for varying the speed and direction of movement of the toy to provide movements which are more attractive to pets and which are not apparently repetitive and, hence, are more challenging and interesting to the pet, especially to cats.

These and other objects and features of the present invention will be apparent from the following detailed description, taken with reference to the figures of the accompanying drawings.

DETAILED DESCRIPTION OF THE INVENTION

Figure 1:
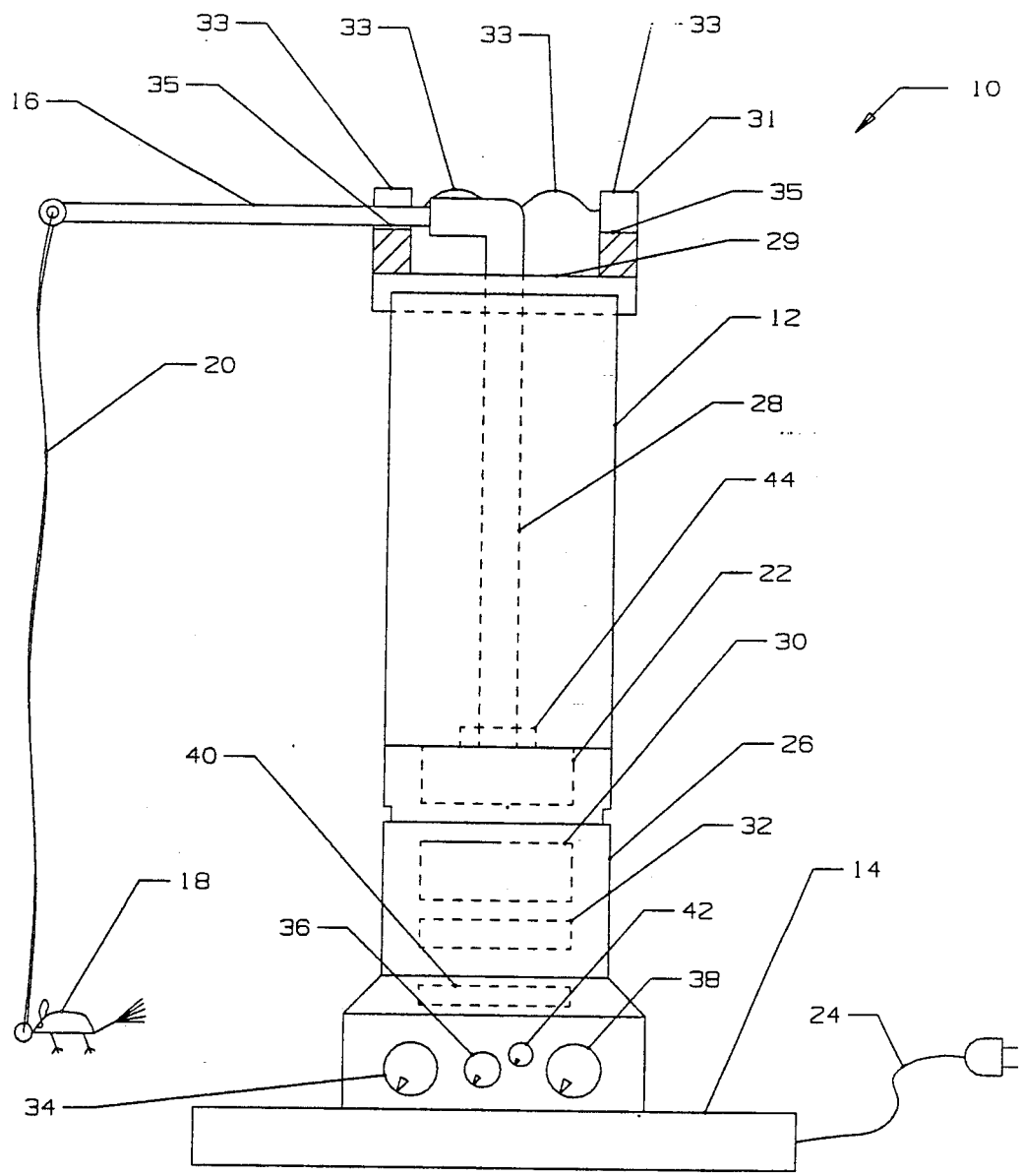
FIG. 1 is a side view of a pet exercising device embodying the present invention.
Figure 2:
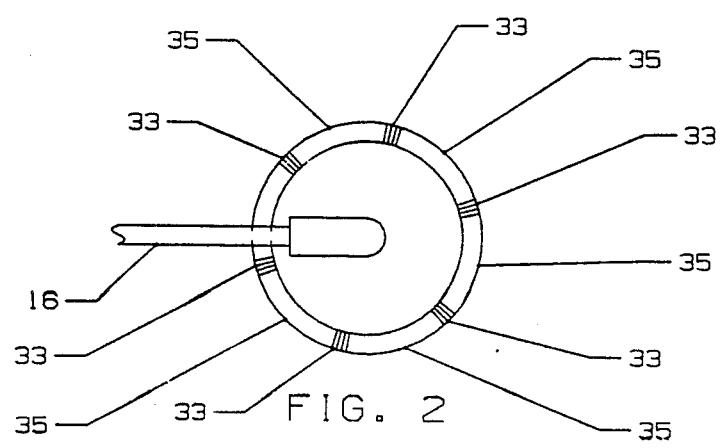
FIG. 2 is a top view of the pet exercising device of FIG. 1.

In that form of the present invention chosen for purposes of illustration in the drawing, FIG. 1 shows a pet exercising device, indicated generally at 10, having a generally cylindrical, hollow pylon 12 supported on a base 14 and having an arm 16 rotatably mounted on the top of the pylon 12 with a toy, such as stuffed mouse 18 secured to the end of the arm 16 by suitable means, such as string 20. Within the pylon 12 is an electric motor 22, which is energized by suitable means, such as electric cord 24, through a control box 26, and which serves to drive the arm 16 by suitable means, such as drive shaft 28. The top 29 of the pylon 12 is provided with a camming surface 31, shown in FIG. 2 as an annular ring extending about the periphery of the top 29 of the pylon 12 and having a plurality of alternate ridges 33 and valleys 35 spaced about the camming surface 31. As seen in FIG. 1, the arm 16 rides on the camming surface 31, which results in irregular movement of the string 20 and toy 18. Obviously, the specific shape of the ridges 33 and valleys 35, and the spacing between them, may be varied substantially as desired to produce irratic movement of the arm 16 and toy 18 to further enhance the appeal of the device 10 to pets. The control box 26 contains speed control means 30 for regulating the rate of rotation of the motor 22 and direction control means 32 for regulating the direction of rotation of the motor 22. The direction control means 32 includes means for periodically reversing the direction of rotation and for controlling the lengths of the intervals between such direction changes. Control knobs 34, 36 and 38 are provided on the face of the control box 26 to enable the operator to regulate the speed control means 30 and direction control means 32. If desired, a timer 40 may be included in the control box 26, controlled by knob 42, to allow the operator to cause the exercising device 10 to be automatically activated at a desired time, without requiring the operator to be present at the desired time. Finally, a pressure-sensitive switch 44 may be attached to sense movement of the drive shaft 28 and to respond to such movement in any of a variety of ways. For example, if the pet exercising device 10 is turned "OFF" and the cat bats the arm 16 or toy 18 with its paw, the motion will be transmitted through arm 16 and drive shaft 28 to the switch 44 causing the motor 22 to turn "ON". If desired, the signal from switch 44 may be passed to the timer 40 to provide a predetermined period of operation in response to such movement, after which the timer 40 will turn the motor 22 "OFF" again. If the motor 22 is turned "ON" when the switch 44 is activated, as if the cat is clinging to the toy 18 and resisting the efforts of the motor 22 and arm 16 to move the toy, the signal from the switch 44 may serve to reverse the direction of rotation of the motor 22 or turn the motor 22 "OFF", to prevent overloading and possible burnout of the motor 22.

In use, the operator plugs the electrical cord 24 into a standard electrical outlet, not shown, and adjusts control knobs 34 and 36, as desired, to regulate the speed control means 30 and direction control means 32 and, thereby, to regulate the speed and initial direction of rotation of the motor 22 and arm 16. Knob 38 allows the operator to determine the length of the interval between changes of the rotational direction. If desired, the operator can also use control knob 42 to set the timer 40 to cause the exercising device 10 to be activated at a desired future time. When activated, motor 22 will turn the drive shaft 28 which will cause arm 16 to rotate and will move the toy 18 at the desired speed and in the desired direction. After the predetermined interval, set by knob 38, the direction of rotation will be reversed and motor 22 will cause the toy 18 to be moved in the reverse direction. Thus, the movement of the toy will initiate automatically and the speed and direction of movement of the toy will vary, as determined by the knobs 34, 36, 38 and 42 of the control box 26. This variable motion of the toy 18 has been found to be extremely attractive to cats and greatly increases their desire to play with the toy 18 and, consequently, causes the cat to exercise.

If desired, the device 10 may also be used for activating fishing lures, with the lure substituted for the toy 18, to provide a lifelike movement of the lures and, hence, to attract fish. Also, the motor 22 could be energized by suitable batteries, instead of by the electrical cord 14. In addition, numerous other variations and modifications can, obviously, be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A pet exercising device comprising:
a pylon,
an arm rotatably mounted on said pylon,
a toy secured to said arm,
a motor connected to drive said arm, and
control means responsive to interference with the movement of said arm for regulating the speed and direction of movement of said motor.
2. The device of claim 1 wherein:
said pylon is a hollow cylinder, and
said motor is mounted within said pylon.
3. The device of claim 1 wherein:
said motor is an electric motor.
4. The device of claim 3 further comprising:
an electrical cord for supplying electrical energy to said motor,
5. The device of claim 3 further comprising:
battery means for supplying electrical energy to said motor.
6. The device of claim 1 wherein:
said control means comprises means for varying the speed of said motor.
7. The device of claim 1 wherein:
said control means comprises means for changing the direction of movement of said motor and said arm at preselected intervals.
8. The device of claim 7 wherein:
said control means comprises means for varying the length of said preselected intervals during operation.
9. The device of claim 1 wherein:
said control means comprises a timer for activating said motor at a preselected time.
10. The device of claim 9 further comprising:
a pressure-sensitive switch responsive to movement of said arm to cause said timer to activate said motor for a predetermined period.
11. The device of claim 1 wherein:
said control means is mounted within said pylon.
12. The device of claim 1 further comprising:
a camming surface provided on the top of said pylon and engageable by said arm to vary the movement of said arm and said toy.
13. A pet exercising device comprising:
a pylon,
an arm rotatably mounted on said pylon,
a toy secured to said arm,
a motor connected to drive said arm,
control means for regulating the speed and direction of movement of said motor, and
a pressure-sensitive switch responsive to movement of said arm to control the operation of said pet exercising device.

14. The device of claim 13 wherein:
said pressure-sensitive switch is responsive to movement of said arm when said motor is turned "OFF" to turn said motor "ON".

15. The device of claim 13 wherein:
said pressure-sensitive switch is responsive to movement of said arm when said motor is turned "ON" to cause said motor to reverse the direction of rotation of said arm.

16. The device of claim 13 wherein:
said pressure-sensitive switch is responsive to movement of said arm when said motor is turned "ON" to turn said motor "OFF".

* * * * *